June 24, 1969 L. R. ENGELBRECHT 3,452,156
RADIO TRANSMISSION SYSTEM WITH INDEPENDENT DIVERSITY
RECEPTION OF PLURAL SIDEBAND COMPONENTS
Filed Feb. 25, 1966
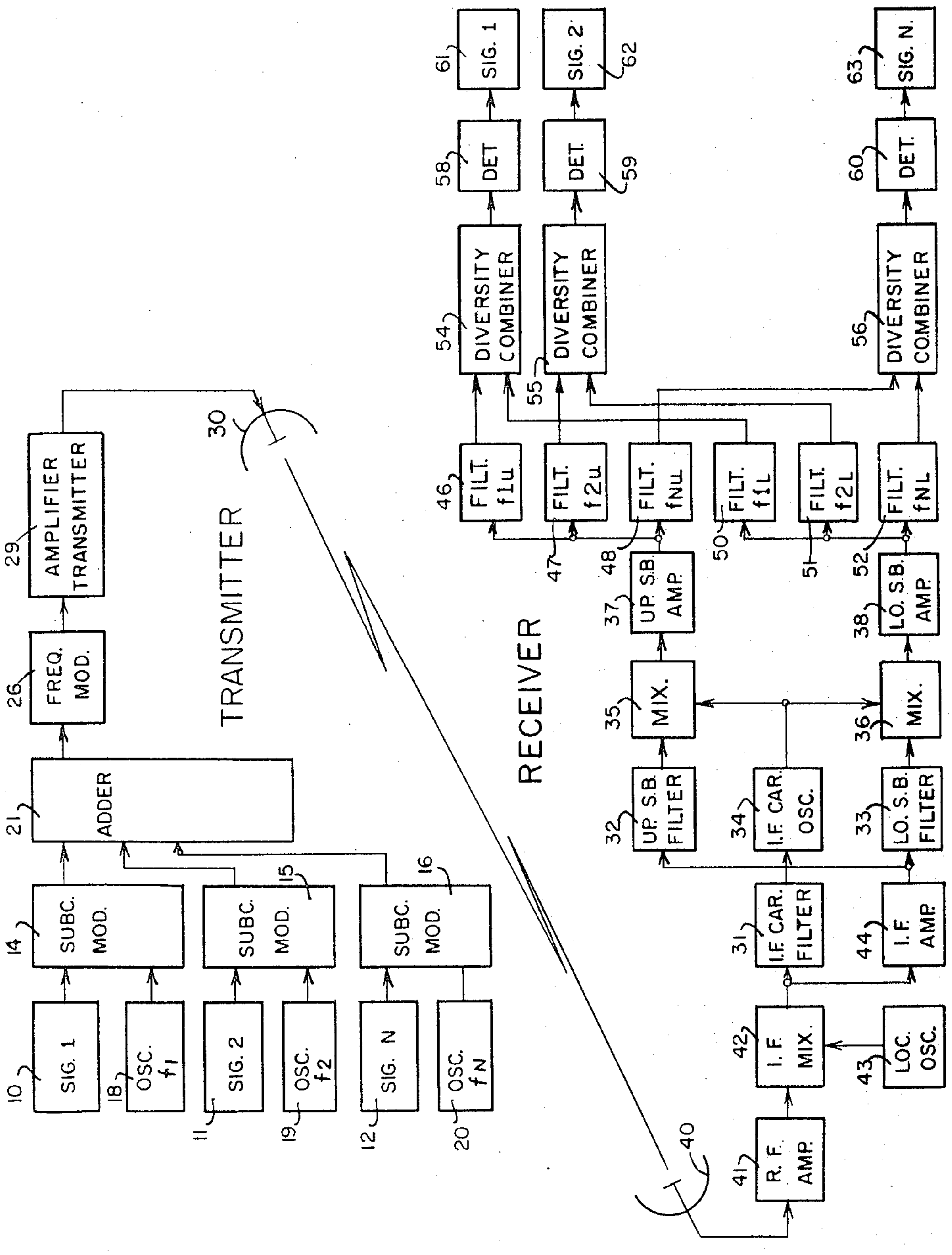
Inventor
By LLOYD R. ENGELBRECHT.
Mueller, Aichele & Rauner
Attys.

1

3,452,156

RADIO TRANSMISSION SYSTEM WITH INDEPENDENT DIVERSITY RECEPTION OF PLURAL SIDEBAND COMPONENTS

Lloyd R. Engelbrecht, Westchester, Ill., assignor to Motorola, Inc., Franklin Park, Ill., a corporation of Illinois Filed Feb. 25, 1966, Ser. No. 530,039
Int. Cl. H04b *1/00, 3/00*
U.S. Cl. 179—15 5 Claims

ABSTRACT OF THE DISCLOSURE

A radio transmission system including a multiplex carrier wave having plural sideband components, said sideband components respectively corresponding to modulated subcarrier waves. A receiver has plural filters to frequency separate the upper and lower sideband components. Diversity combiners are connected to the filters for the first order of sideband components of the respective modulated subcarrier waves for diversity combining same independent one of the other. Detection means detect the diversity combined signals for reproducing the original modulating signals.

This invention relates to a frequency division multiplex system with separate reception of each frequency modulated (FM) sideband.

It has been proposed to overcome the difficulty of noncoherent sidebands, which appear with double sideband FM modulation techniques when the transmission medium is characterized by severe multi-path delays, by an independent sideband reception. Using a multi-channel communication system, a carrier frequency wave is modulated with frequency division multiplex subcarriers and is transmitted. At the receiver the upper and lower sidebands of the carrier frequency are received. The sidebands are selected by separate channel filters for each subcarrier and each FM sideband. These channel filters require a bandwidth which is broader than the bandwidth of the frequency modulated subcarrier band to be selected, because of frequency shifting along the transmission link or transmitter and receiver frequency instabilities.

It is an object of this invention to provide an improved independent sideband detection system, wherein the upper and lower sideband can be utilized in the detection process without requiring a coherence between both the sidebands.

It is another object of the invention to provide an improved independent sideband detection system for a plurality of channels, wherein each channel can be detected in its optimum bandwidth without requiring additional bandwidth for the channel filter of each channel.

It is a further object of the invention to provide an independent sideband detection system, wherein the equipment is relatively simple and inexpensive.

A feature of the invention is the provision of a detector for providing a reference signal derived from the transmitter carrier for separately heterodyning the upper sideband set of the frequency division multiplexed subcarrier signals and the lower sideband set of the frequency division multiplexed subcarrier signals to produce two baseband outputs which are then filtered in narrow filters to recover independently each multiplex channel.

The invention is illustrated in the drawing which shows a block diagram of the multiplexing and modulating equipment at the transmitter and of the demodulating and independent sideband detection equipment at the receiver.

In a specific form of the invention, subcarrier fre-

2 quencies coordinated to a plurality of channels are frequency modulated with the individual signals of a plurality of signal sources. At the baseband the frequency modulated subcarriers are frequency division multiplexed and utilized to modulate a carrier wave. The carrier frequency is frequency modulated with a low modulation index of about 0.2 to 0.25 by all frequency division multiplexed subcarriers and is transmitted simultaneously. At the receiver both first order sidebands are received. Because of the low modulation index, the amplitude of the higher order sidebands are considerably reduced to a low level below the amplitude of the first order sidebands. The received modulated carrier wave is amplified and successively heterodyned to an intermediate frequency (IF) by superimposing with a local frequency in an IF mixer. The IF signal after amplification is then applied through an upper sideband filter and a lower sideband filter to converting mixers respectively and heterodyned to baseband by separate use of the recovered carrier frequency to produce independent upper and lower sidebands at baseband frequency. The recovered carrier frequency is applied to the converting mixers from a carrier frequency oscillator which is phased locked by the recovered carrier derived from an IF carrier filter coupled to the IF mixer. In order to separate the different FM subcarrier bands of the first order sidebands, channel filters are provided which are constructed to pass the bandwidth of the corresponding subcarrier band of the upper or lower sideband. The outputs of the corresponding numbered subcarriers of the upper and lower sidebands are combined for diversity utilization. The diversity combiner selects the optimum signal received and applies it to a detector which provides the demodulated individual signals.

Referring now to the drawing, there is shown a block diagram of the transmitter and the receiver. The transmitter comprises a plurality of input sources 10, 11 and 12 for the signals *SiG*1, *SiG*2 and *SiG*N. It will be apparent that the system may have more input sources, and the ones indicated are representative of all. The input sources may consist of single unmodulated signals or any kind of modulated or multiplexed signals.

The signals of the input sources 10, 11 and 12 are applied to subcarrier modulators 14, 15 and 16 respectively. An oscillator 18 generating the subcarrier frequency *f*1 is coupled to the modulator 14 and respective oscillators 19 and 20 generating the subcarrier frequencies *f*2 and *f*N are coupled to the modulators 15 and 16. In the modulators 14, 15 and 16, the subcarriers are modulated by the signals *SiG*1, *SiG*2, and signal *SiG*N of the corresponding input sources.

The modulated subcarriers are applied to a summing network or adder 21 to form a baseband signal consisting of frequency division multiplexed subcarriers. This combined signal is used to further modulate a carrier by frequency modulation. The modulation index of each subcarrier in the RF carrier is maintained at approximately 0.2 to suppress the second and higher order Bessel products of the modulation process. The carrier frequency usually utilized is between 500 and 10,000 megacycles. After amplification of the modulated carrier frequency in amplifier 29 the FM signal is radiated through antenna 30.

The receiver of the system has an antenna 40 which applies the received signal to a radio frequency (RF) amplifier 41. The amplified signals are then superimposed in a mixer 42 with the frequency of the local oscillator 43 to produce an IF signal. In the IF amplifier 44, the IF signal is amplified and applied to an upper sideband filter 32 and a lower sideband filter 33 respectively. The IF carrier filter 31 selects the carrier of the IF signal and applies the same to oscillator 34 which is phase locked by the recovered carrier. The IF carrier wave of oscillator 34 is applied to mixers 35 and 36 and superimposed with the signals of the upper and lower sideband filters 32 and 33, respectively, to heterodyne the IF signal to baseband. Since the IF carrier frequency of oscillator 34 is very stable, the baseband signals at the outputs of the mixers 35 and 36 are not shifted in frequency. The signal from mixer 35 is amplified in upper sideband IF amplifier 37 and the signal from mixer 36 is amplified in lower sideband IF amplifier 28.

The upper and lower sideband signals are applied to separate receiver channels for each sideband. These receiver channels comprise the upper sideband filters 46, 47 and 48 for the FM bands of the subcarrier *f*1U, *f*2U and *f*NU and the lower sideband filters 50, 51 and 52 for the FM bands of subcarriers *f*1L, *f*2L and *f*NL. It will be apparent that the number of channel filters is twice the number of the input sources at the receiver, because the upper and lower sidebands of each subcarrier are separately selected. The system may have more channels than the three illustrated and the ones indicated are all representative of all.

The signals from the channel filters are applied to diversity combiners 54, 55 and 56 in such a way that the corresponding upper and lower channel filters of the same subcarrier are coupled to the input of one diversity combiner. Detectors 58, 59 and 60 are coupled respectively to the outputs of the diversity combiners 54, 55 and 56, and demodulate the subcarriers and apply signals to output circuits 61, 62 and 63 respectively. The signals S*i*G1, S*i*G2 and S*i*GN correspond to the signals at the input sources and may represent direct information, or information which has to be processed in further equipment to provide understandable information.

The transmitter described for a separate sideband reception technique uses according to the invention a sufficiently low modulation index for FM. Thus, only the characteristic first order sidebands are generated with high amplitude. The amplitude of the higher order sidebands which overlap the first order sidebands when a complex modulation waveform is used, can be reduced to an arbitrarily low level below the first order sidebands by using a small subcarrier modulation index of about 0.2 to 0.25.

The receiver comprises, as already described, channel filters for the upper and lower sidebands of each FM subscriber. The outputs of the filter corresponding to the same subcarrier are combined for dual diversity utilization. The diversity reception takes advantage of the fact that signals of the lower and upper sidebands do not fade simultaneously. Thus, the diversity combiner chooses the signal with higher amplitude and provide good reception of the transmitted information. Because each sideband is selected independently non-coherence of the sidebands does not affect the reception.

Considering the channel frequency assignment, it has been found that a distributed channel spacing and an octave channel spacing gives good results. The distributed channel spacing employs subcarriers which are odd multiples of the lowest subcarrier frequency. With this spacing gaps are left between the channels. In the octave channel spacing, however, the channels are spaced in such a way that the highest numbered channel is slightly less than twice the frequency of the lowest numbered channel. Both types of channel spacing give good immunity to distortion products for low modulation indexes. Concerning the immunity to intersymbol interference, the distributed channel spacing has an advantage in that the channels are spaced twice as far apart. This is important when one particular channel can drop in amplitude due to a fade while its neighbor is not experiencing the same fade. The use of separate receiver channels for each sideband gives good results for both channel spacing techniques, even when the coherent bandwidth of the transmission path is less than the total information bandwidth.

The system described can be provided by the use of well known circuits which are available in simple form. The equipment described can have as many as 24 information channels and provide reliable communication over long haul transmission, and is not critical of adjustment. A great advantage is that unwanted sideband energy can be reduced by using a low modulation index within practical limits so that independent sideband detection can be used with FM modulation of all subcarrier channels. The efficiency of the independent sideband technique is such that reliable communication can be obtained where conventional frequency demodulation does not provide a usable signal. The further advantage of the IF-to-baseband converter is that this technique reduces the transmitter and receiver frequency stability required because the transmitted carrier provides a reference signal for the detection heterodyning process. Since less stability is required, the independent sidebands can be detected in optimum bandwidth improving the independent sideband signal-to-noise ratio. Because the carrier is recovered in a very narrow bandwidth, its use for separately heterodyning upper sideband set of the frequency division multiplexed subcarrier signals and the lower sideband set of the frequency division multiplexed subcarrier signals produces two baseband outputs having the same frequency accuracy as generated in the frequency division multiplex stage of the transmitter. The invention makes the independent sideband detection for tropo and HF ionispheric scatter links applicable and allows each independent sideband to be detected in its optimum bandwidth, i.e., no additional bandwidth per channel is required to allow for instability.

I claim:

1. A frequency modulation communication system including in combination, a plurality of signal input means for receiving individual signals, a plurality of subcarrier modulation means each one coupled to one of said signal input means, oscillator means coupled to said subcarrier modulation means and applying to each modulation means a subcarrier wave of a different frequency, said subcarrier modulation means providing subcarrier waves frequency modulated by said individual signals, adder means coupled to said subcarrier modulation means to form a frequency division multiplexed signal at the baseband, carrier wave modulation means coupled to said adder means providing a carrier wave frequency modulated with a relatively low modulation index by said frequency division multiplexed signal, transmitter means for transmitting the frequency modulated carrier waves, receiver means for receiving said frequency modulated carrier waves, said receiver means including input means, filter means coupled to said input means for recovering said carrier wave and for producing signals corresponding to the upper and lower sidebands of said modulated carrier waves, converter means for mixing said upper and lower sideband signals with said recovered carrier wave to convert said frequency division multiplexed signal to baseband, frequency selective means for deriving the individual sidebands of each subcarrier wave, diversity combiner means coupled to said frequency selective means for each subcarrier wave for selecting the one of the upper and lower sideband having optimum energy level, subcarrier wave detector means coupled to said diversity combiner means for deriving said individual signals.

2. A frequency modulation communication system according to claim 1 in which said filter means includes carrier filter means for recovering said carrier wave and upper and lower sideband filter means coupled in parallel with said carrier filter means to said input means, and said converter means includes injection locked oscillator means coupled to said carrier filter means for providing a wave of the recovered carrier frequency, first converting mixer means coupled to said upper sideband filter means, second converting mixer means coupled to said lower sideband filter means, said injection locked oscillator means being couple to said first and second converting mixer means, so that said recovered carrier is heterodyned with the upper sideband signal derived from the upper sideband filter and with the lower sideband signal derived from the lower sideband filter to produce two baseband outputs which are then separated in said frequency selective means.

3. A frequency modulation communication system according to claim 1 in which said receiver means includes a second intermediate frequency mixer and a fourth local oscillator coupled between said input and said converter means for superimposing said frequency modulated carrier waves and the signal of said fourth local oscillator to form an intermediate frequency wave applied to said converter means.

4. A frequency modulation communication receiver including in combination, input means for receiving carrier frequency waves frequency modulated with the modulated subcarrier waves, filter means coupled to said input means for recovering said carrier wave and for producing signals corresponding to the upper and lower sidebands of said modulated carrier waves, converter means for mixing said upper and lower sideband signals with said recovered carrier wave to convert said frequency division multiplexed signal to baseband, frequency selective means for deriving the individual sidebands of each subcarrier wave, diversity combiner means coupled to said frequency selective means for each subcarrier wave for selecting the one of the upper and lower sideband having optimum energy level, subcarrier wave detector means coupled to said diversity combiner means for deriving individual signals, said receiver including intermediate frequency mixer and a local oscillator coupled between said input means, injection locked oscillator means coupled to said frequency modulated carrier waves and the signal of said local oscillator means to form an intermediate frequency wave applied to said converter means.

5. A frequency modulation communication receiver according to claim 4 in which said input means includes amplification means, and in which said filter means includes carrier filter means for recovering said carrier wave coupled to said input means, upper sideband filter means and lower sideband filter means coupled in parallel with said carrier filter means to said amplification means, injection locked oscillator means coupled to said carrier filter means for providing a wave of the recovered carrier frequency, and in which further said converter means includes first converting mixer means coupled to said upper sideband filter means and second converting mixer means coupled to said lower sideband filter means, said injection locked oscillator means being coupled to said first and second converting mixer means, so that said recoverd carrier is heterodyned with the upper sideband signal derived from the upper sideband filter and with the lower sideband signal derived from the lower sideband filter to produce upper and lower baseband outputs, upper sideband amplifier means coupled to said first converting mixer means and lower sideband amplifier means coupled to said second converting mixer means for amplifying the signal of said upper and lower baseband.

References Cited

FOREIGN PATENTS 536,041 4/1941 Great Baitain.

RALPH D. BLAKESLEE, *Primary Examiner.*

U.S. Cl. X.R.

325—47, 56, 61, 154, 466; 343—200